United States Patent
Storrie et al.

(10) Patent No.: US 8,400,142 B2
(45) Date of Patent: Mar. 19, 2013

(54) LINEAR POSITION SENSOR WITH ANTI-ROTATION DEVICE

(75) Inventors: William D. Storrie, Motherwell (GB); Robert L. Newman, Edwardsburg, MI (US)

(73) Assignee: CTS Corporation, Elkhart, IN (US)

( * ) Notice: Subject to any disclaimer, the term of this patent is extended or adjusted under 35 U.S.C. 154(b) by 545 days.

(21) Appl. No.: 12/592,170

(22) Filed: Nov. 20, 2009

(65) Prior Publication Data
US 2010/0127697 A1    May 27, 2010

Related U.S. Application Data

(60) Provisional application No. 61/200,244, filed on Nov. 26, 2008.

(51) Int. Cl.
*G01B 7/14* (2006.01)
(52) U.S. Cl. ............... 324/207.24; 324/207.11; 324/219
(58) Field of Classification Search ........................ None
See application file for complete search history.

(56) References Cited

U.S. PATENT DOCUMENTS

| | | | |
|---|---|---|---|
| 2,134,072 | A | 10/1938 | Christensen |
| 2,355,721 | A | 8/1944 | Foutz |
| 2,478,575 | A | 8/1949 | Fitch |
| 2,738,808 | A | 3/1956 | Hartzell et al. |
| 2,849,091 | A | 8/1958 | Newell |
| 2,939,486 | A | 6/1960 | Demay |
| 2,976,686 | A | 3/1961 | Stelzer |
| 3,082,792 | A | 3/1963 | Jenkins et al. |
| 3,136,227 | A | 6/1964 | Williams |
| 3,397,621 | A | 8/1968 | Groves |
| 3,509,795 | A | 5/1970 | Woodward |
| 3,575,088 | A | 4/1971 | Bauer |
| 3,648,571 | A | 3/1972 | Burgess |
| 3,859,619 | A | 1/1975 | Ishihara et al. |
| 3,911,793 | A | 10/1975 | Izumi |
| 4,005,639 | A | 2/1977 | Welsh |
| 4,056,043 | A | 11/1977 | Sriramamurty et al. |
| 4,070,946 | A | 1/1978 | Sandvik et al. |
| 4,088,977 | A * | 5/1978 | Bowman et al. ............ 338/32 R |

(Continued)

FOREIGN PATENT DOCUMENTS

| CA | 2635228 | 6/2007 |
|---|---|---|
| DE | 7424147 | 10/1974 |

(Continued)

OTHER PUBLICATIONS

Melexis (Microelectronic Integrated Systems) MLX90316 Rotary Position Sensor IC Data Sheet Dated Sep. 20, 2005, pp. 1-34, Melexis NV, Ieper, Belgium.

(Continued)

*Primary Examiner* — Minh N Tang
(74) *Attorney, Agent, or Firm* — Daniel J. Deneufbourg (57) ABSTRACT

An anti-rotation device or assembly for preventing the rotation of a magnet in a linear position sensor and eliminating the risk of undesired magnetic field measurements and incorrect sensor signal outputs. In one embodiment, the anti-rotation device is an anti-rotation plate which is fixed to the housing of the linear position sensor and a magnet carrier which includes at least one finger extending into a receptacle defined in either the edge or the body of the magnet carrier to prevent the magnet carrier from rotating relative to the plate. In another embodiment, the magnet carrier includes a key and the magnet includes a groove. The key extends into the groove for preventing the rotation of the magnet in the magnet carrier.

4 Claims, 12 Drawing Sheets

U.S. PATENT DOCUMENTS

| | | | |
|---|---|---|---|
| 4,128,044 A | 12/1978 | Larson et al. | |
| 4,230,077 A | 10/1980 | Ito | |
| 4,237,076 A | 12/1980 | Benjamin | |
| 4,256,019 A | 3/1981 | Braddick | |
| 4,282,800 A | 8/1981 | Young et al. | |
| 4,283,679 A | 8/1981 | Ito et al. | |
| 4,312,319 A | 1/1982 | Brakebill | |
| 4,377,070 A | 3/1983 | Shadbourne | |
| 4,403,538 A | 9/1983 | Rise | |
| 4,437,386 A | 3/1984 | Baumgartner | |
| 4,462,359 A | 7/1984 | Muller | |
| 4,478,107 A | 10/1984 | Buannec | |
| 4,502,847 A | 3/1985 | Pozniak et al. | |
| 4,543,790 A | 10/1985 | Coll et al. | |
| 4,639,667 A * | 1/1987 | Andresen | 324/207.18 |
| 4,642,603 A | 2/1987 | Martinez, Jr. | |
| 4,733,214 A * | 3/1988 | Andresen | 338/128 |
| 4,746,772 A | 5/1988 | Bovee et al. | |
| 4,756,229 A | 7/1988 | Drakeley | |
| 4,761,608 A | 8/1988 | Franklin et al. | |
| 4,805,744 A | 2/1989 | Pringle | |
| 4,809,657 A | 3/1989 | Sejimo et al. | |
| 4,850,263 A | 7/1989 | Rumsey et al. | |
| 4,857,842 A | 8/1989 | Sturman et al. | |
| 4,915,018 A | 4/1990 | Scott et al. | |
| 5,016,523 A | 5/1991 | Bowyer | |
| 5,177,370 A | 1/1993 | Meister | |
| 5,226,312 A | 7/1993 | Gautier et al. | |
| 5,226,347 A | 7/1993 | Gautier et al. | |
| 5,270,645 A | 12/1993 | Wheeler et al. | |
| 5,293,811 A | 3/1994 | Delair et al. | |
| 5,487,273 A | 1/1996 | Elpern et al. | |
| 5,570,015 A | 10/1996 | Takaishi et al. | |
| 5,727,447 A | 3/1998 | Shiraishi | |
| 5,771,774 A | 6/1998 | Stojic | |
| 5,811,968 A | 9/1998 | Nakazawa et al. | |
| 5,955,881 A | 9/1999 | White et al. | |
| 6,018,241 A | 1/2000 | White et al. | |
| 6,057,682 A | 5/2000 | McCurley et al. | |
| 6,105,927 A | 8/2000 | Zelczer et al. | |
| 6,155,048 A | 12/2000 | Vertanen | |
| 6,164,187 A | 12/2000 | Stojic | |
| 6,175,233 B1 | 1/2001 | McCurley et al. | |
| 6,189,435 B1 | 2/2001 | Vertanen et al. | |
| 6,255,941 B1 | 7/2001 | Osterman et al. | |
| 6,289,602 B1 | 9/2001 | Chiddister | |
| 6,304,078 B1 | 10/2001 | Jarrard et al. | |
| 6,349,629 B1 | 2/2002 | Plantan et al. | |
| 6,352,137 B1 | 3/2002 | Stegall et al. | |
| 6,356,811 B1 | 3/2002 | Beselt | |
| 6,360,649 B1 | 3/2002 | Plantan | |
| 6,369,689 B1 | 4/2002 | Osmer et al. | |
| 6,417,768 B2 | 7/2002 | Osterman et al. | |
| 6,501,375 B1 | 12/2002 | Weant et al. | |
| 6,526,866 B2 | 3/2003 | Pisoni et al. | |
| 6,536,329 B2 | 3/2003 | Anderson et al. | |
| 6,536,469 B2 | 3/2003 | Dilger et al. | |
| 6,564,554 B2 | 5/2003 | Hercey et al. | |
| 6,633,157 B1 | 10/2003 | Yamaki et al. | |
| 6,662,708 B2 | 12/2003 | Hosny | |
| 6,690,158 B2 | 2/2004 | Saito et al. | |
| 6,748,848 B1 | 6/2004 | Riley et al. | |
| 6,752,171 B1 | 6/2004 | Kemmler et al. | |
| 6,888,451 B1 | 5/2005 | Plantan | |
| 6,968,742 B2 | 11/2005 | Rodenhauser et al. | |
| 6,988,443 B2 | 1/2006 | Morris | |
| 7,014,016 B2 | 3/2006 | Morris et al. | |
| 7,044,444 B2 | 5/2006 | Haubold et al. | |
| 7,194,946 B2 | 3/2007 | Bacardit | |
| 7,199,578 B2 | 4/2007 | Rohner et al. | |
| 7,219,691 B2 | 5/2007 | Gethmann et al. | |
| 7,340,895 B2 | 3/2008 | Noelle | |
| 7,387,080 B2 | 6/2008 | Andronic | |
| 7,423,421 B2 | 9/2008 | Reichert | |
| 7,439,732 B2 | 10/2008 | LaPlaca | |
| 7,451,690 B2 | 11/2008 | Schrader et al. | |
| 7,454,979 B2 | 11/2008 | Frank et al. | |
| 7,570,047 B2 | 8/2009 | Stuve et al. | |
| 7,762,220 B2 | 7/2010 | Okanovic et al. | |
| 7,823,385 B2 | 11/2010 | McEwen et al. | |
| 7,852,067 B2 | 12/2010 | Schmid et al. | |
| 7,946,555 B2 * | 5/2011 | Ikeda | 251/129.11 |
| 2003/0030958 A1 | 2/2003 | Saito et al. | |
| 2004/0250678 A1 | 12/2004 | Bonotto et al. | |
| 2005/0061144 A1 | 3/2005 | Schall | |
| 2005/0087067 A1 | 4/2005 | Vermoesen et al. | |
| 2007/0257219 A1 | 11/2007 | Perrin | |
| 2008/0230328 A1 | 9/2008 | Lacroix et al. | |
| 2009/0139587 A1 | 6/2009 | Spliethoff et al. | |
| 2009/0140730 A1 | 6/2009 | Newman et al. | |
| 2009/0205332 A1 | 8/2009 | Baeuerle et al. | |
| 2009/0206846 A1 * | 8/2009 | Sanchez et al. | 324/662 |
| 2010/0127697 A1 | 5/2010 | Storrie et al. | |
| 2011/0079138 A1 | 4/2011 | Storrie et al. | |
| 2011/0247484 A1 | 10/2011 | Klesbauer et al. | |
| 2011/0262266 A1 | 10/2011 | Rakod et al. | |
| 2011/0308897 A1 | 12/2011 | Wallace et al. | |

FOREIGN PATENT DOCUMENTS

| | | |
|---|---|---|
| DE | 29 23 644 | 12/1979 |
| DE | 100 59 337 | 6/2001 |
| DE | 10 2005 013442 | 9/2006 |
| DE | 10 2005 029904 | 1/2007 |
| DE | 10 2006 021 129 | 6/2007 |
| DE | 10 2006 021 127 | 8/2007 |
| DE | 10 2008 030503 | 1/2009 |
| DE | 10 2008 011701 | 9/2009 |
| DE | 10 2009 032958 | 1/2011 |
| DE | 20 2011 03003 | 4/2011 |
| EP | 96408 | 12/1983 |
| EP | 261537 | 3/1988 |
| EP | 0 738 892 | 10/1996 |
| EP | 1 182 461 | 2/2002 |
| EP | 1 701 015 | 9/2006 |
| EP | 1 884 636 | 2/2008 |
| EP | 1 972 916 | 9/2008 |
| EP | 2 068 061 | 6/2009 |
| EP | 2 161 460 | 3/2010 |
| EP | 2 208 893 | 7/2010 |
| EP | 2 199 565 | 1/2011 |
| EP | 1 852 588 | 5/2011 |
| EP | 1 852 587 | 6/2011 |
| EP | 1 852 586 | 9/2011 |
| GB | 2256050 | 11/1992 |
| GB | 2261472 | 5/1993 |
| GB | 2322164 | 8/1998 |
| GB | 2468779 | 9/2010 |
| JP | 05 264326 | 10/1993 |
| WO | WO03/093769 A1 | 11/2003 |
| WO | 2009/073170 | 6/2009 |

OTHER PUBLICATIONS

CTS Corporation, EGR history with poti sensors (2011), 7 pages, Elkhart, Indiana.

Woco Industrietechnik GmbH, Woco Actuators, www.wocogroup.com (2011), 1 page, Bad Soden-Salmünster, Germany.

SMK, SMK Actuators, www.smk-systeme.de (2011), 2 pages, Filderstadt, Germany.

Padmini VNA Mechatronics Pvt. Ltd., Padmini EGR/Secondary AIR Injection, www.padminivna.com (2009), 1 page, Gurgaon, India.

Padmini VNA Mechatronics Pvt. Ltd., Padmini Actuator, www.padminivna.com (2009), 1 page, Gurgaon, India.

CTS Automotive Products, product brochure for 586 Series Non-Contacting, 2-Piece Linear Position Sensor (2009), 2 pages, Elkhart, Indiana.

CTS Corporation, CTS 569 Turbo Sensor, Exploded views and Cross Section Detail (2011), 4 pages, Elkhart, Indiana.

CTS Automotive Products, product brochure for 569 Series High Temperature Linear Position Sensor (2007), 2 pages, Elkhart, Indiana.

CTS Automotive Products, product brochure for 537 Series Linear EGR Sensor (2007), 2 pages, Elkhart, Indiana.

INZI Controls Company, INZI Vacuum Actuators, www.inzicontrols.devu.kr (2007), 3 pages, Kyunggi-do, Korea.

* cited by examiner

LINEAR POSITION SENSOR WITH ANTI-ROTATION DEVICE

CROSS-REFERENCE TO RELATED APPLICATIONS

This application claims the benefit of the filing date and disclosure of U.S. Provisional Application Ser. No. 61/200,244, filed on Nov. 26, 2008 which is explicitly incorporated herein by reference as are all references cited therein.

FIELD OF THE INVENTION

This invention relates in general to linear position sensors and, more specifically, to devices to prevent the rotation of the magnet used in a non-contacting linear position sensor.

BACKGROUND OF THE INVENTION

Position sensing is used to electronically monitor the position or movement of a mechanical component. The position sensor produces an electrical signal that varies as the position of the component in question varies. Electrical position sensors are included in many products. For example, position sensors allow the status of various automotive components to be monitored and controlled electronically.

A position sensor needs to be accurate, in that it must give an appropriate electrical signal based upon the position measured. If inaccurate, a position sensor may hinder the proper evaluation and control of the position of the component being monitored.

Typically, it is also a requirement that a position sensor be adequately precise in its measurement. However, the precision needed in measuring a position will obviously vary depending upon the particular circumstances of use. For some purposes, only a rough indication of position is necessary; for instance, an indication of whether a valve is mostly open or mostly closed. In other applications, more precise indication of position may be needed.

A position sensor should also be sufficiently durable for the environment in which it is placed. For example, a position sensor used on an automotive valve may experience almost constant movement while the automobile is in operation. Such a position sensor should be constructed of mechanical and electrical components adequate to allow the sensor to remain sufficiently accurate and precise during its projected lifetime, despite considerable mechanical vibrations and thermal extremes and gradients.

In the past, position sensors were typically of the "contact" variety. A contacting position sensor requires physical contact to produce the electrical signal. Contacting position sensors typically consist of potentiometers that produce electrical signals which vary as a function of the component's position. Contacting position sensors are generally accurate and precise. Unfortunately, the wear due to contact during movement has limited their durability. Also, the friction resulting from the contact can degrade the operation of the component. Further, water intrusion into a potentiometric sensor can disable the sensor.

One advancement in sensor technology has been the development of non-contacting position sensors. A non-contacting position sensor ("NPS") does not require physical contact between the signal generator and the sensing element. Instead, an NPS utilizes magnets to generate magnetic fields that vary as a function of position, and devices to detect varying magnetic fields to measure the position of the component to be monitored. Often, a Hall effect device is used to produce an electrical signal that is dependent upon the magnitude and polarity of the magnetic flux incident upon the device. The Hall effect device may be physically attached to the component to be monitored and thus moves relative to the stationary magnet(s) as the component moves. Conversely, the Hall effect device may be stationary with the magnet(s) affixed to the component to be monitored. In either case, the position of the component to be monitored can be determined by the electrical signal produced by the Hall effect device.

The use of an NPS presents several distinct advantages over the use of a contacting position sensor. Because an NPS does not require physical contact between the signal generator and the sensing element, there is less physical wear during operation, resulting in greater sensor durability. The use of an NPS is also advantageous because the lack of any physical contact between the items being monitored and the sensor itself results in reduced drag.

While the use of an NPS presents several advantages, there are also several disadvantages that must be overcome in order for an NPS to be a satisfactory position sensor for many applications. Irregularities or imperfections in the magnet can compromise the precision and accuracy of an NPS. The accuracy and precision of an NPS can also be affected by the mechanical vibrations and perturbations likely to be experienced by the sensor which, in turn, can cause the magnet or magnet carrier to rotate. Because there is no physical contact between the item to be monitored and the sensor, it is possible for the magnet or magnet carrier to be knocked out of alignment as a result of such vibrations and perturbations. A misalignment or rotation of the magnet relative to the sensor can result in the measured magnetic field at any particular location not being what it would be in the original alignment. Because the measured magnetic field can be different than that when properly aligned, the perceived position can be inaccurate. Linearity of magnetic field strength and the resulting signal is also a concern.

SUMMARY OF THE INVENTION

The present invention is directed broadly to a linear position sensor which comprises a housing, a magnet carrier located in the housing, a magnet located in the magnet carrier, and several different embodiments of anti-rotation means or devices associated with the magnet carrier for preventing the rotation of the magnet outside of allowable variations in rotational movement and eliminating the risk of undesired magnetic field measurements and incorrect sensor signal outputs.

More specifically, in one embodiment, the magnet carrier includes a base having at least one receptacle defined therein and the anti-rotation means comprises an anti-rotation plate which is coupled to the housing and the magnet carrier and the magnet carrier includes at least one finger which extends into the receptacle in the base of the magnet carrier to prevent the rotation of the magnet carrier and thus the rotation of the magnet.

In one embodiment, the base of the magnet carrier includes a peripheral edge and the receptacle is defined by a groove formed in the peripheral edge of the magnet carrier.

In another embodiment, the base of the magnet carrier includes a lower surface and the receptacle is defined by a groove formed in the lower surface of the magnet carrier. The groove may be a circumferentially extending slot formed in the lower surface of the magnet carrier.

In a further embodiment, the base of the magnet carrier includes opposed upper and lower surfaces and the receptacle is defined by a through-hole which extends between the upper and lower surfaces of the magnet carrier.

In yet another embodiment, the anti-rotation plate includes at least one interior slot formed therein which defines the finger and the finger is adapted to abut and exert a force against the lower surface of the base of the magnet carrier.

In yet a further embodiment, the magnet carrier includes a magnet housing having an interior surface with a key defined by a projection and the anti-rotation means comprises a groove in the magnet. The projection in the magnet carrier extends into the groove in the magnet to prevent the rotation of the magnet. The projection may be formed in an interior side surface of the magnet housing and the groove may be defined in an exterior side surface of the magnet. Alternatively, the projection may be formed in an interior base surface of the magnet housing and the groove may be defined in an exterior bottom surface of the magnet. Still further, the magnet housing may include at least one prong extending from a peripheral top edge thereof and another groove may be defined in an exterior top surface of the magnet and the prong extends into the groove in the exterior top surface of the magnet.

There are other advantages and features of this invention which will be more readily apparent from the following detailed description of the embodiments of the invention, the drawings, and the appended claims.

BRIEF DESCRIPTION OF THE DRAWINGS

These and other features of the invention can best be understood by the following description of the accompanying drawings as follows.

DETAILED DESCRIPTION OF THE EMBODIMENTS

Figure 1:
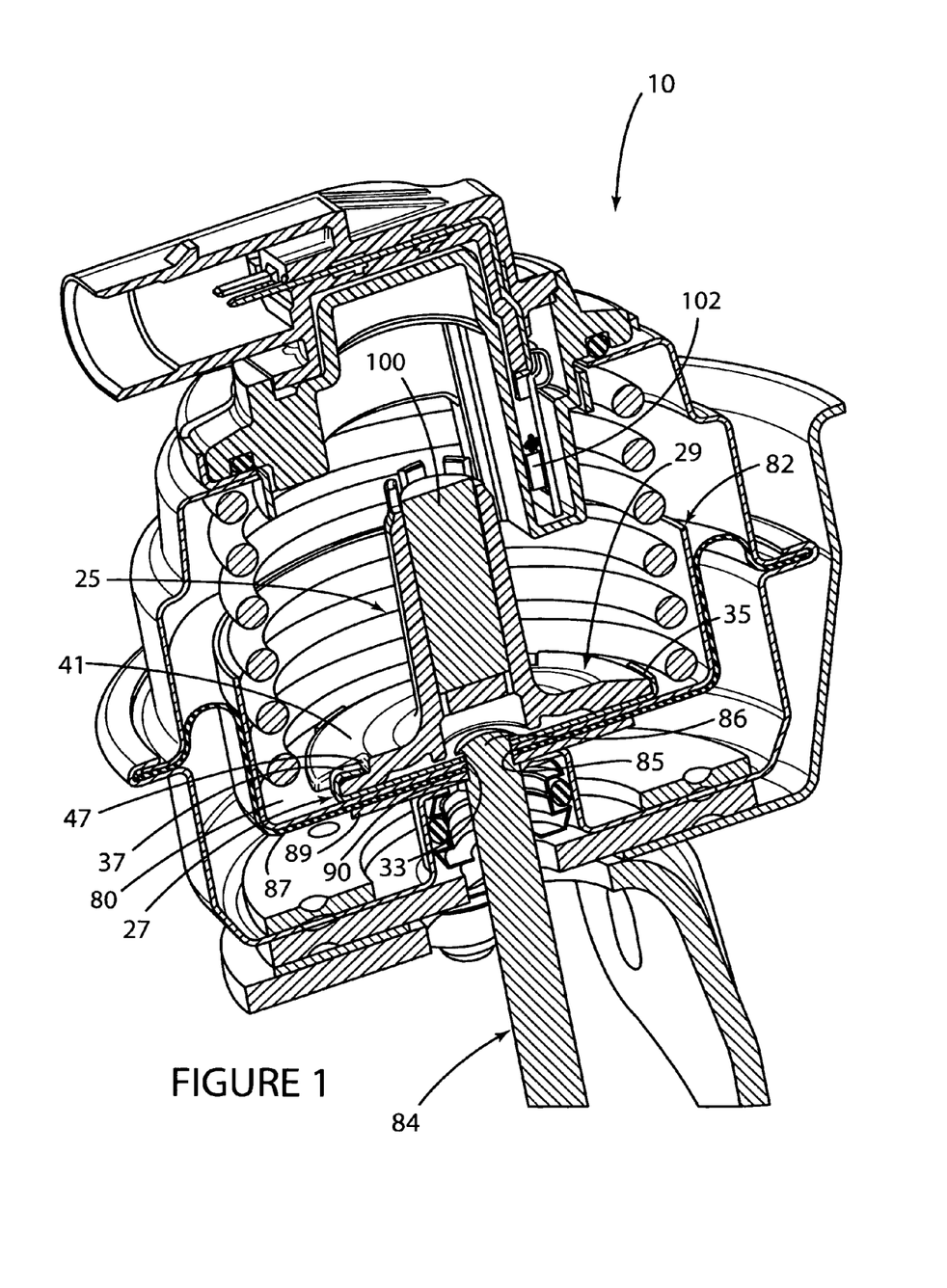
FIG. 1 is a part vertical cross-sectional view, part perspective view of a linear position sensor with a first embodiment of a magnet carrier/anti-rotation plate combination or device in accordance with the present invention.
Figures 2, 3:
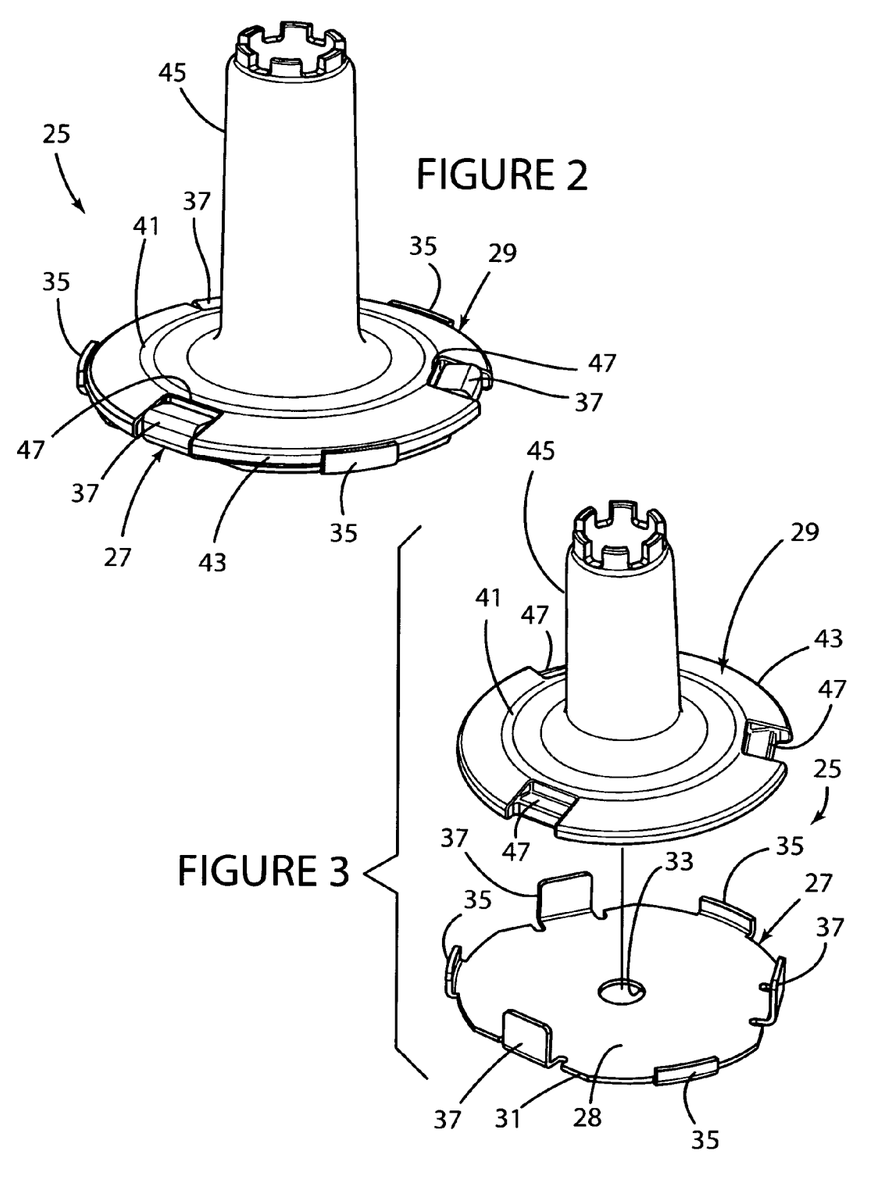
FIG. 2 is an enlarged perspective view of the magnet carrier/anti-rotation plate combination shown in FIG. 1.
FIG. 3 is an enlarged exploded perspective view of the magnet carrier and anti-rotation plate shown in FIGS. 1 and 2.

A first embodiment of an anti-rotation magnet carrier/anti-rotation plate assembly or device or combination 25 in accordance with the present invention is shown in FIGS. 1-3 which comprises an anti-rotation disc or plate 27 and a magnet carrier 29.

Anti-rotation disc or plate 27 has a circular solid base 28, an outer circumferentially extending peripheral edge 31, a central through-hole or aperture 33, and a plurality of tabs or fingers 35 and 37 projecting outwardly and upwardly away from the peripheral edge 31 and extending around the base 28 in a spaced-apart, equidistant, and alternating relationship. Anti-rotation disc or plate 27 can be stamped from sheet metal. The tabs or fingers 35 are wider and shorter than the tabs or fingers 37.

Magnet carrier 29 has a generally circular base 41 with a circumferentially extending outer peripheral edge 43; a vertical, hollow magnet tube or housing 45 extending generally normally upwardly from a central portion of the base 41; and a plurality of receptacles in the form of recesses, grooves, notches, or slots 47 which are formed in the peripheral edge 43 and extend around the base 41 in a spaced-apart, equidistant relationship. Magnet carrier 29 may be made from any suitable thermoplastic material.

As shown in FIG. 1, anti-rotation disc or plate 27 is seated flat against the base plate 80 of a cup 82 located in the interior of linear position sensor 10 in a relationship wherein the central aperture 33 in anti-rotation plate 27 is in alignment with a central aperture 85 defined in the base plate 80 of cup 82 of linear position sensor 10. Linear position sensor 10 additionally comprises an elongate, generally cylindrically-shaped shaft 84 which extends through the aligned apertures 33 and 85 in the plate 27 and base 80 respectively. The shaft 84 includes a head 86 having a width greater than the diameter of the shaft 84 and a circumferential recess or groove defined in the outer surface on the shaft 84 below the head 86 which defines a shoulder 90 spaced from the head 86. The anti-rotation plate 27 and base 80 together with a portion of a membrane 87 located below the base 80 and another plate 89 located below the membrane 87 are sandwiched between the head 86 and the shoulder 90 of shaft 84 to clamp the plate 27 to the base 80 of the cup 82 and keep the plate 27 from moving or rotating relative to the cup 82.

As shown in FIGS. 1 and 2, magnet carrier 29 is seated over the anti-rotation plate 27 in a relationship wherein the lower face of the base 41 of magnet carrier 29 is seated in abutting relationship against the upper face of the base 28 of anti-rotation plate 27; the peripheral edge 43 of the base 41 of magnet carrier 29 is abutted against the interior face of each of the tabs 35 on the base 28 of anti-rotation plate 27; and fingers 37 are aligned with the notches 47. The fingers 37 are bent inwardly from their FIG. 3 positions to their crimped FIGS. 1 and 2 positions in which the fingers 37 are located in the respective notches 47 and abutted against surface 41 of magnet carrier 29 to prevent the magnet carrier 29 from rotating relative to the plate 27 which, in turn, prevents the magnet 100 (FIG. 1) in magnet carrier 29 from rotating relative to the sensor 102 (FIG. 1) outside of allowable variations of rotational movement to eliminate the risk of unacceptable deviations in the signal generated by the sensor 102. This, of course, is important inasmuch as any deviations in the rotational movement of magnet 100 from the magnet's original programmed state can induce undesired magnetic field variations and cause incorrect signal outputs.

Figure 4:
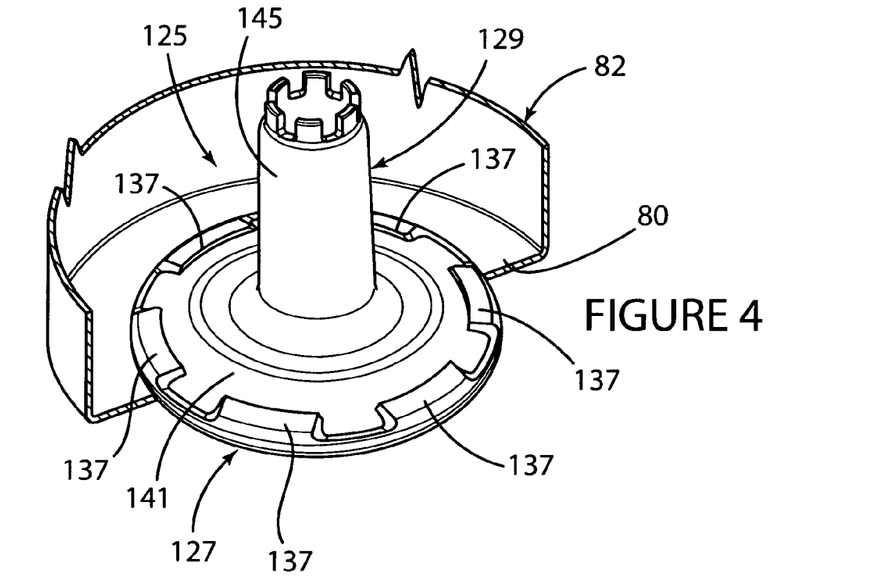
FIG. 4 is an enlarged broken perspective view of a second embodiment of a magnet carrier/anti-rotation plate combination in accordance with the present invention.
Figure 5:
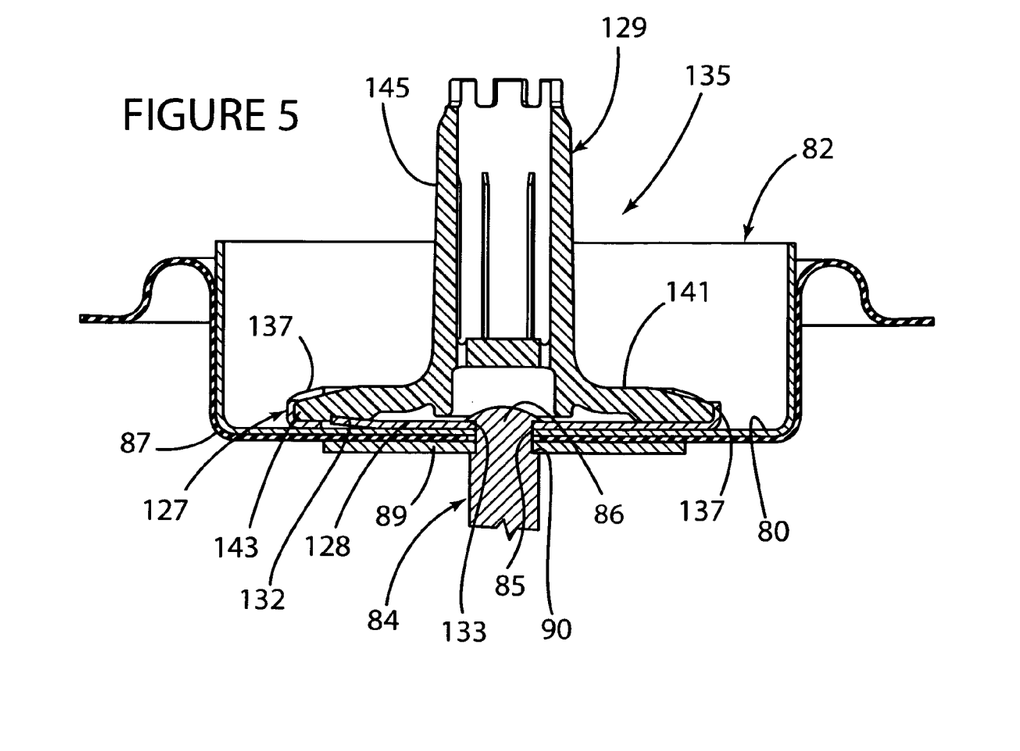
FIG. 5 is an enlarged vertical cross-sectional view of the magnet carrier/anti-rotation plate embodiment of FIG. 4 coupled to the base in the interior of a linear position sensor as shown in FIG. 1.
Figure 6:
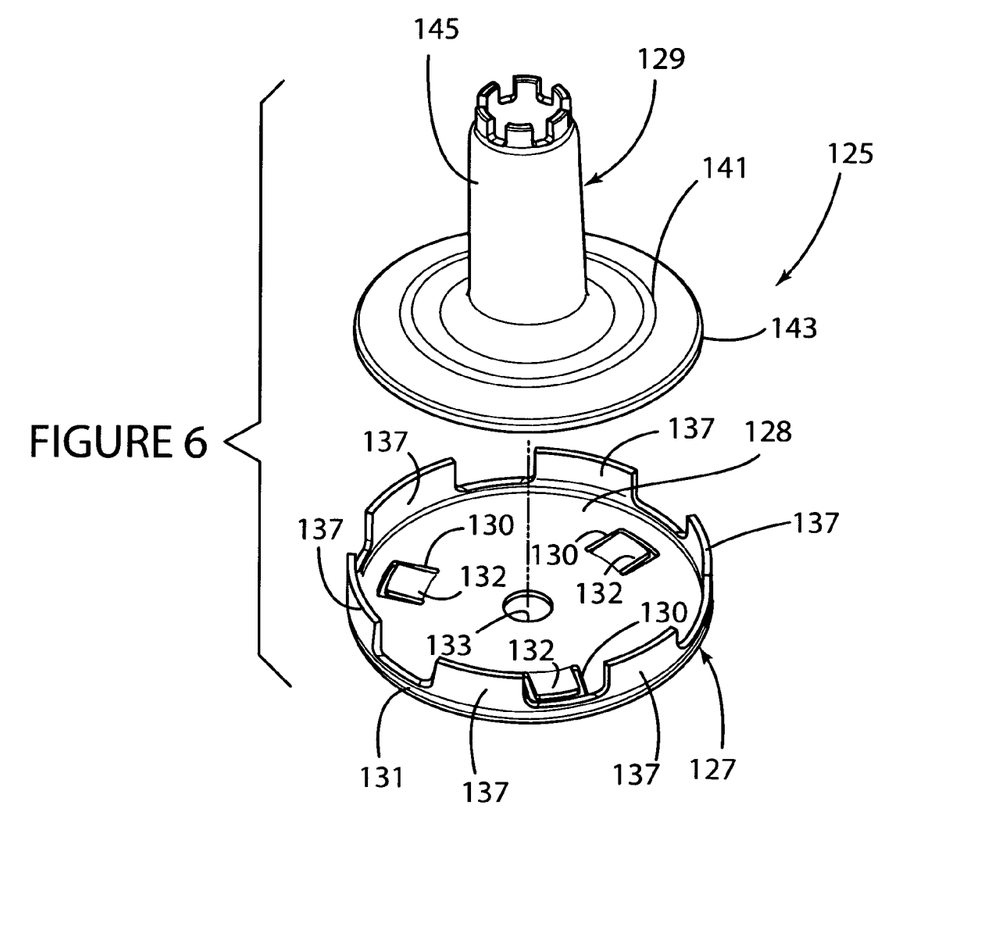
FIG. 6 is an enlarged exploded perspective view of the magnet carrier and anti-rotation plate combination shown in FIGS. 4 and 5.

Another embodiment of anti-rotation assembly 125 in accordance with the present invention is shown in FIGS. 4-6.

Anti-rotation assembly 125 comprises an anti-rotation disc or plate 127 and a magnet carrier 129. Anti-rotation disc or plate 127 has a circular solid base or plate 128, an outer circumferentially extending edge 131, a central aperture 133, and a plurality of tabs 137 projecting outwardly and upwardly from the edge 131 of plate 127 and extending around the base 128 in equidistant, spaced-apart relationship. The base 128 additionally defines a plurality of interior spaced-apart, equidistant, generally U-shaped slots 130 defining a plurality of circumferentially extending interior raised pre-stressed prongs, tabs, or fingers 132. Anti-rotation disc or plate 129 can be stamped from sheet metal.

Magnet carrier 129, which may be made from any suitable thermoplastic material, includes a generally circular base 141 having an outer circumferentially extending peripheral edge 143 and a central generally cylindrical, hollow magnet tube or housing 145 extending upwardly from the center of the base 141.

As shown in FIG. 5, anti-rotation disc or plate 127 is seated on the base 80 of the cup 82 in the interior of linear position sensor 10 and the shaft 84 secures the plate 127 against rotational movement relative to the base 80 in the same manner as the plate 27 of anti-rotation assembly 25, and thus the earlier description with reference to the attachment of the plate 27 of assembly 25 to the base 80 is incorporated herein by reference.

As shown in FIGS. 4 and 5, the bottom face or surface of the base 141 of magnet carrier 129 is seated against the upper face or surface of the base 128 of plate 127 in a relationship wherein the prongs 132 in the base 128 of plate 127 abut against the bottom surface of the base 141 of magnet carrier 129. Tabs 137 on the base 141 of magnet carrier 129 are bent and crimped inwardly into abutting relationship with the top face or surface of the base 141 to secure the base 141 and thus the magnet carrier 129 to the plate 127, thus preventing the rotation of the magnet carrier 129 relative to the plate 127 and the rotation of magnet 100 (FIG. 1) relative to the sensor 102 (FIG. 1) outside of allowable variations in rotational movement to eliminate the risk of undesired magnetic field measurements and incorrect sensor signal outputs.

According to this embodiment, the crimp force exerted by the tabs 137 on the base 141 exerts a downward force against the base 141 which, in turn, causes the raised pre-stressed prongs or tabs 137 on plate 127 to flatten out. The pre-stress prongs 137, however, are also adapted to flex with the thermoplastic material of the base 141 as a result of thermal exposure to reduce the effects of creep and eliminate the rotation of the magnet carrier 129.

Figure 7:
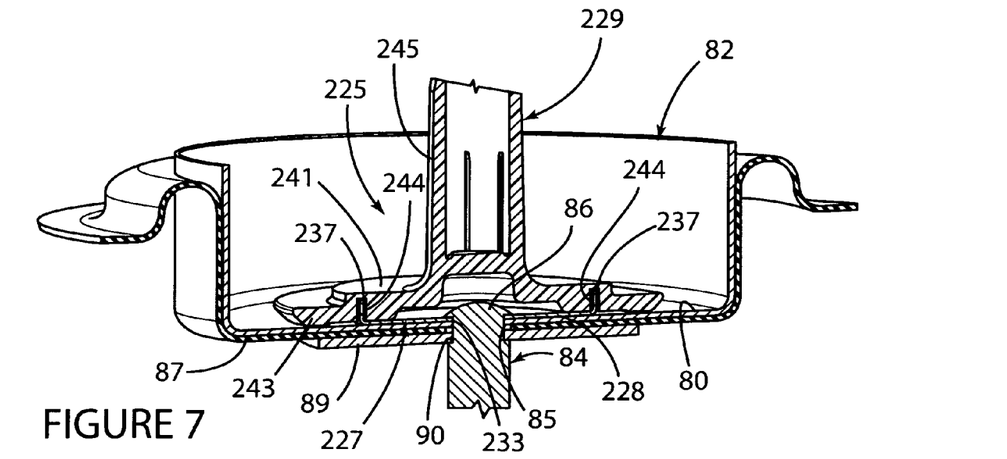
FIG. 7 is an enlarged broken part vertical cross-sectional view, part perspective view of a third embodiment of a magnet carrier/anti-rotation plate combination in accordance with the present invention coupled to the base in the interior of a linear position sensor as shown in FIG. 1.
Figure 8:
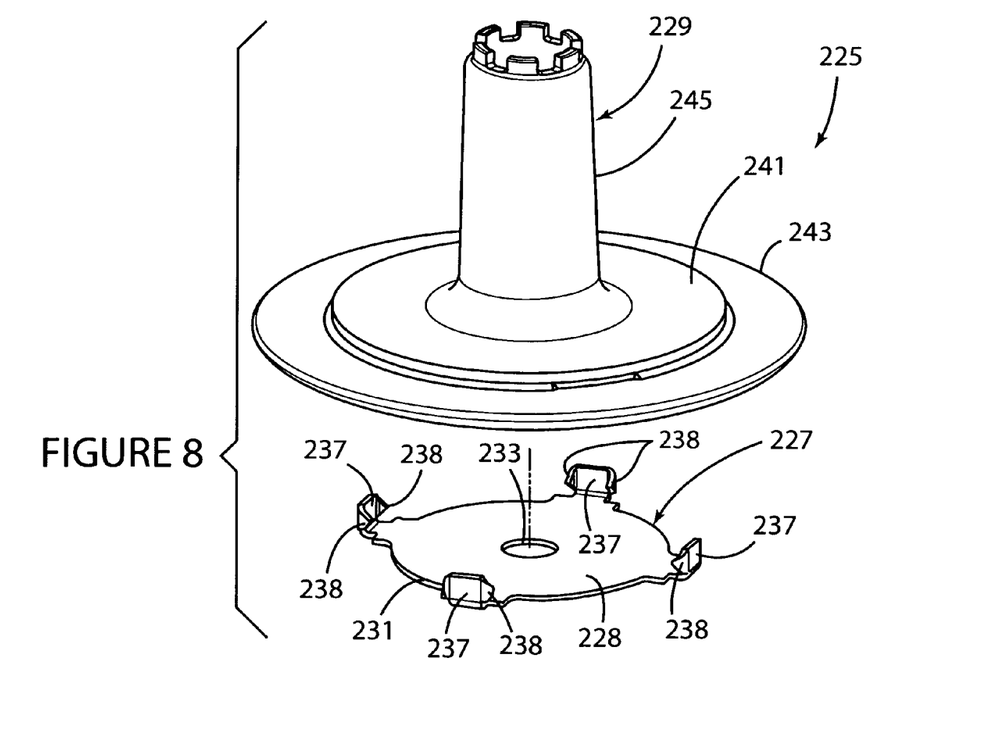
FIG. 8 is an enlarged exploded perspective view of the magnet carrier and anti-rotation plate shown in FIG. 7.
Figure 9:
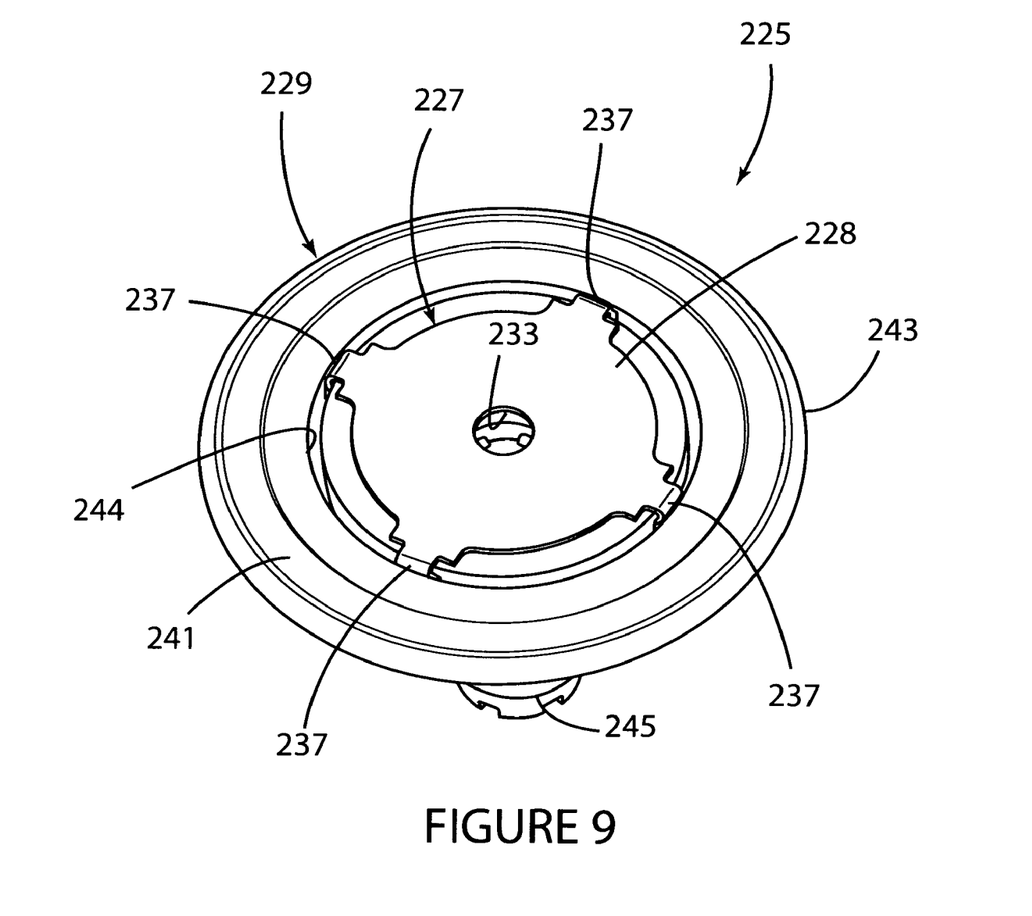
FIG. 9 is an enlarged bottom perspective view of the magnet carrier/anti-rotation plate combination shown in FIGS. 7 and 8.

Another embodiment of an anti-rotation assembly 225 in accordance with the present invention is shown in FIGS. 7-9. Anti-rotation assembly 225 comprises an anti-rotation disc or plate 227 and a magnet carrier 229.

Anti-rotation disc or plate 227 has a circular base 228, an outer circumferential peripheral edge 231, a central aperture 233, and a plurality of prongs 237 extending outwardly and generally normally upwardly from the peripheral edge 231. In the embodiment shown, prongs 237 extend around the base 228 in an equidistant, spaced-apart relationship. Each of the prongs 237 has a pair of sharp points 238 that extend generally normally inwardly from opposed sides of each of the prongs 237. Anti-rotation disc or plate 227 may be stamped from sheet metal.

Magnet carrier 229, which may be made from any suitable thermoplastic material, has a generally circular base 241 with an outer circumferentially extending peripheral edge 243; a vertical, cylindrical, hollow magnet or housing tube 245 extending generally upwardly from a central portion of the top surface or face of the base 241; and an annular circumferentially extending interior receptacle in the form of a slot 244 formed and extending into the bottom surface or face of base 241.

As shown in FIG. 7, the plate 227 of anti-rotation assembly 225 is seated on the base 80 of the cup 82 in linear position sensor 10 and is rigidly connected to the shaft 84 of linear position sensor 10 in the same manner as the plate 27 of anti-rotation assembly 25 and thus the earlier description with reference to assembly 25 is incorporated herein by reference.

As shown in FIGS. 7 and 9, the bottom face or surface of the base 241 of magnet carrier 229 is seated against the upper face or surface of the base 228 of the plate 227 in a relationship wherein the prongs 237 on plate 227 are aligned with and extend into respective portions of the slot 244 in the bottom face or surface of the base 241 of magnet carrier 229. The sharp points 238 on each of the prongs 237 have a length which is greater than the width of the slot 244 so that the points 238 wedge into the material of the base 241 upon insertion of the prongs 237 in base 241 to secure the magnet carrier 229 to the plate 227 and prevent the rotation of the magnet carrier 229 relative to the plate 227 which, in turn, prevents the rotation of the magnet 100 (FIG. 1) relative to the sensor 102 (FIG. 1) outside of allowable variations in rotational movement to eliminate the risk of undesired magnetic field measurements and incorrect sensor signal outputs.

Figure 10:
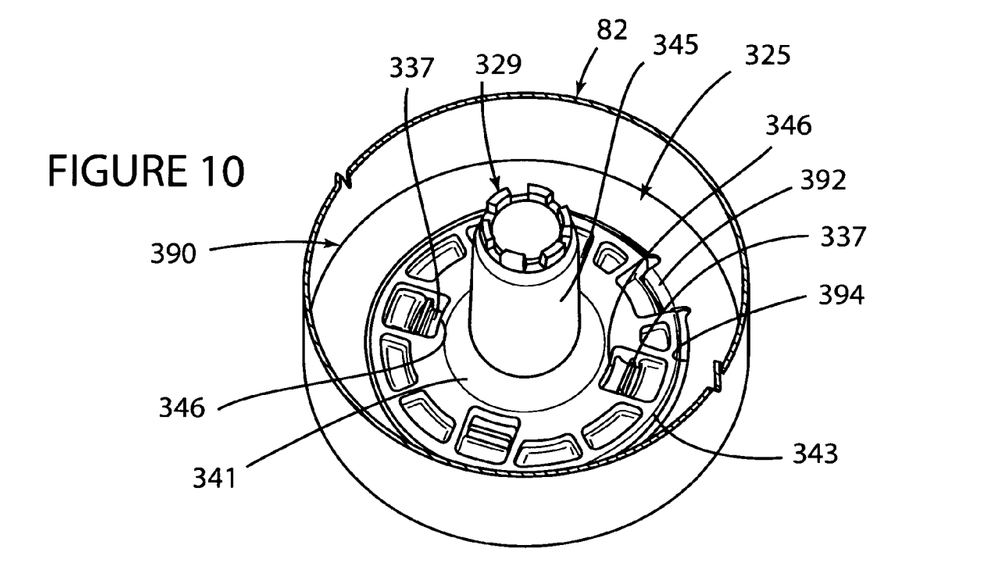
FIG. 10 is an enlarged top broken perspective view of another embodiment of a magnet carrier/anti-rotation plate combination in accordance with the present invention coupled to the base in the interior of a linear position sensor as shown in FIG. 1.
Figure 11:
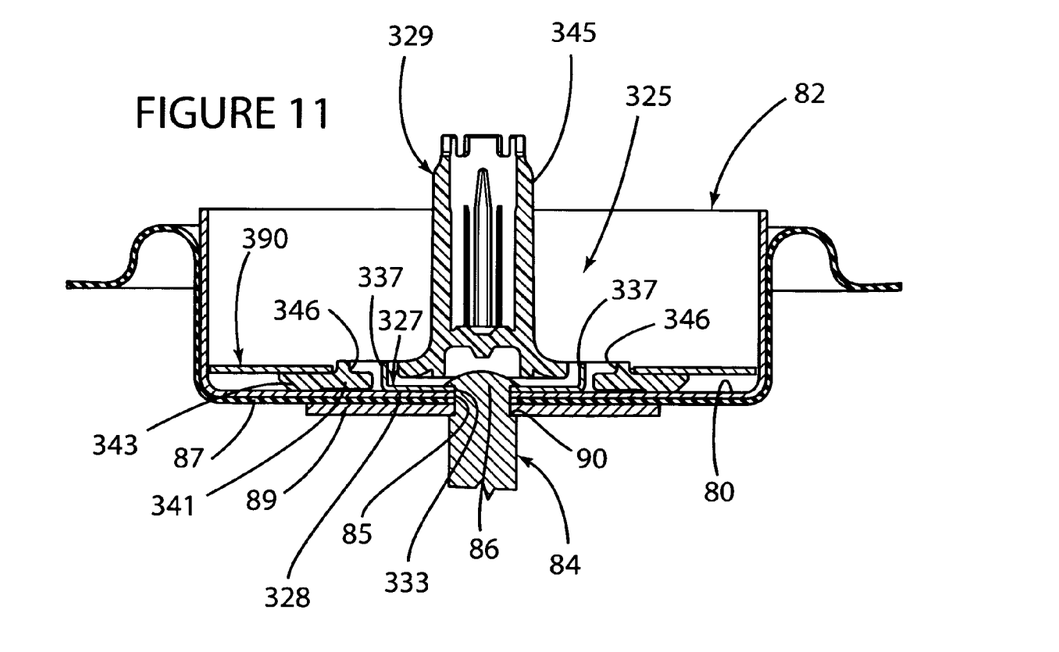
FIG. 11 is an enlarged vertical cross-sectional view of the magnet carrier/anti-rotation plate combination of FIG. 10.
Figure 12:
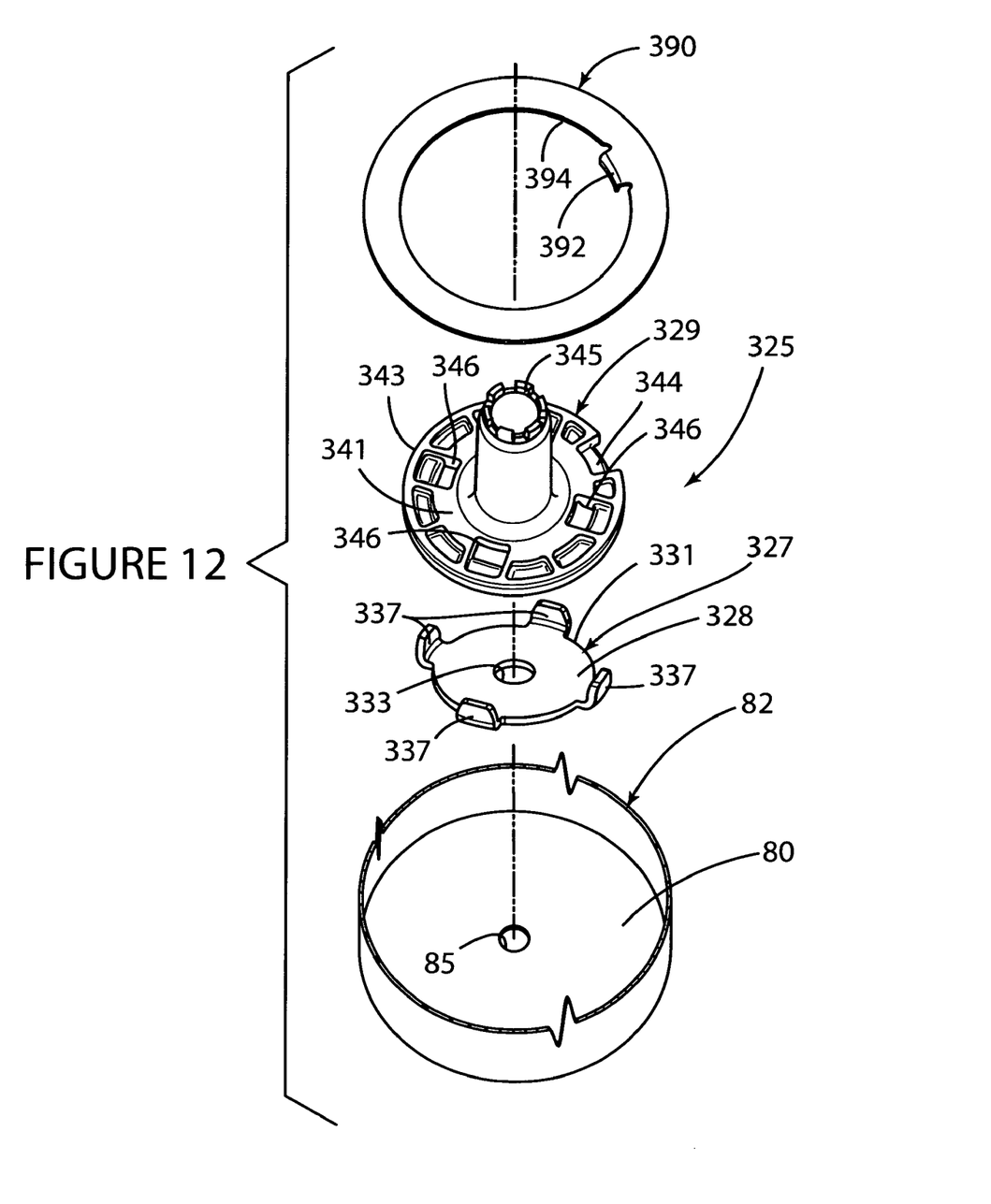
FIG. 12 is a broken exploded perspective view of the magnet carrier and anti-rotation plate combination of FIG. 10.

FIGS. 10-12 depict a further embodiment of an anti-rotation assembly 325 in accordance with the present invention which comprises an anti-rotation disc or plate 327 and a magnet carrier 329.

Anti-rotation disc or plate 327 has a circular base 328, an outer peripheral circumferential edge 331, a central aperture 333, and a plurality of fingers 337 projecting outwardly and generally normally upwardly from the peripheral edge 331 and extending around the base 328 in an equidistant, spaced-apart relationship. Anti-rotation disc or plate 327 may be stamped from sheet metal.

Magnet carrier 329, which may be made from any suitable thermoplastic material has a generally circular base 341 with an outer peripheral circumferential edge 343; a vertical, hollow, cylindrical magnet tube or housing 345 extending normally upwardly from the center of the top surface of the base 341; at least one receptacle in the form of a recess, groove, notch, or slot 344 formed in the peripheral edge 343 of base 341; and a plurality of interior receptacles in the form of through-holes or openings 346 defined in the base 341 and extending between the top and bottom surfaces thereof. Through-holes 346 extend around the base 341 in an equidistant, spaced-apart relationship.

As shown in FIG. 11, anti-rotation disc or plate 327 is seated on the base 80 of the cup 82 in linear position sensor 10 and the shaft 84 of linear position sensor 10 couples and secures the plate 327 to the cup 82 in the same manner as described earlier with respect to the plate 27 of anti-rotation assembly 25, and thus the earlier description with reference to plate 27 is incorporated herein by reference.

As shown in FIGS. 10 and 11, magnet carrier 329 is located and seated in the interior of the cup 82 of linear position sensor 10 in a relationship wherein the bottom face or surface of the base 341 of magnet carrier 329 is seated against the upper face or surface of the base 328 of the plate 327 in a relationship wherein the fingers 337 on plate 327 are aligned with and extend through respective ones of the through-holes 346 defined in the base 329 of magnet carrier 341 to prevent the rotation of the magnet carrier 329 relative to the plate 327 and thus prevent the rotation of magnet 100 (FIG. 1) relative to the sensor 102 (FIG. 1) outside of allowable variations in rotational measurement to eliminate the risk of undesired magnetic field measurements and incorrect sensor signal outputs.

As also shown in FIGS. 10-12, linear position sensor 10 additionally comprises an annular outer ring 390 including a tab 392 which extends generally normally outwardly and downwardly from an interior peripheral circumferential edge 394 of ring 390.

Ring 390 is seated in the cup 82 of linear position sensor 10 in a relationship surrounding and abutting against the top surface of the peripheral circumferential edge 343 of the base 341 of magnet carrier 329 with the tab 392 seated in the groove 344 defined in the edge 342 of the base 341 of magnet carrier 329 to prevent the rotation of the ring 390 relative to the magnet carrier 329 and the cup 82.

Figure 13:
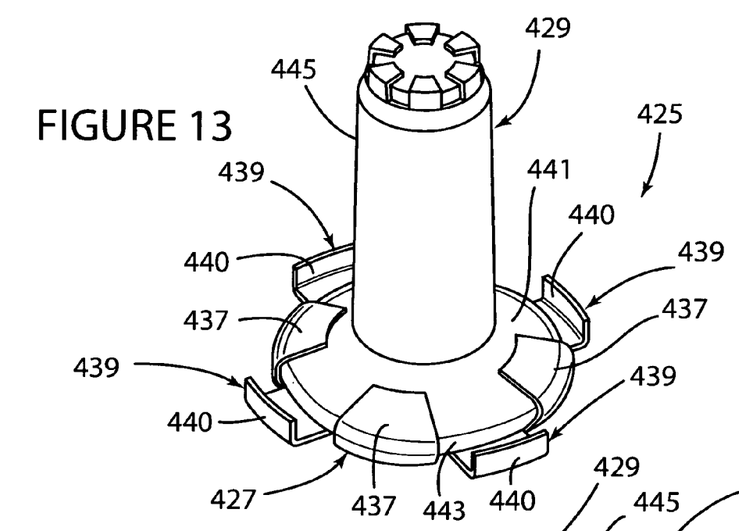
FIG. 13 is an enlarged perspective view of yet another magnet carrier/anti-rotation plate combination in accordance with the present invention.
Figure 14:
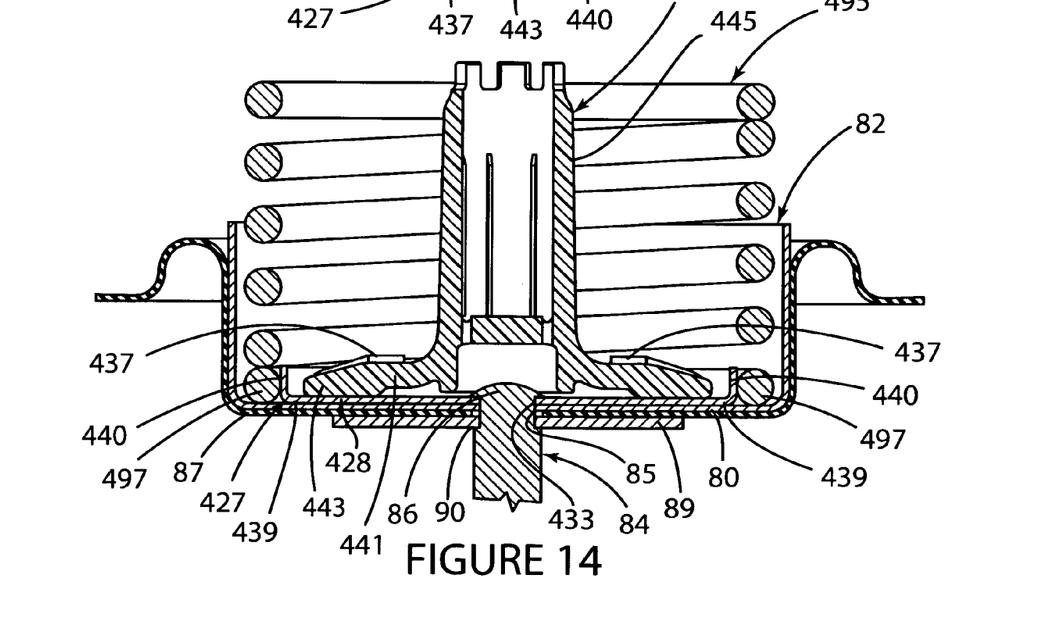
FIG. 14 is an enlarged broken vertical cross-sectional view of the magnet carrier/anti-rotation plate combination of FIG. 13 coupled to the base in the interior of a linear position sensor as shown in FIG. 1.
Figure 15:
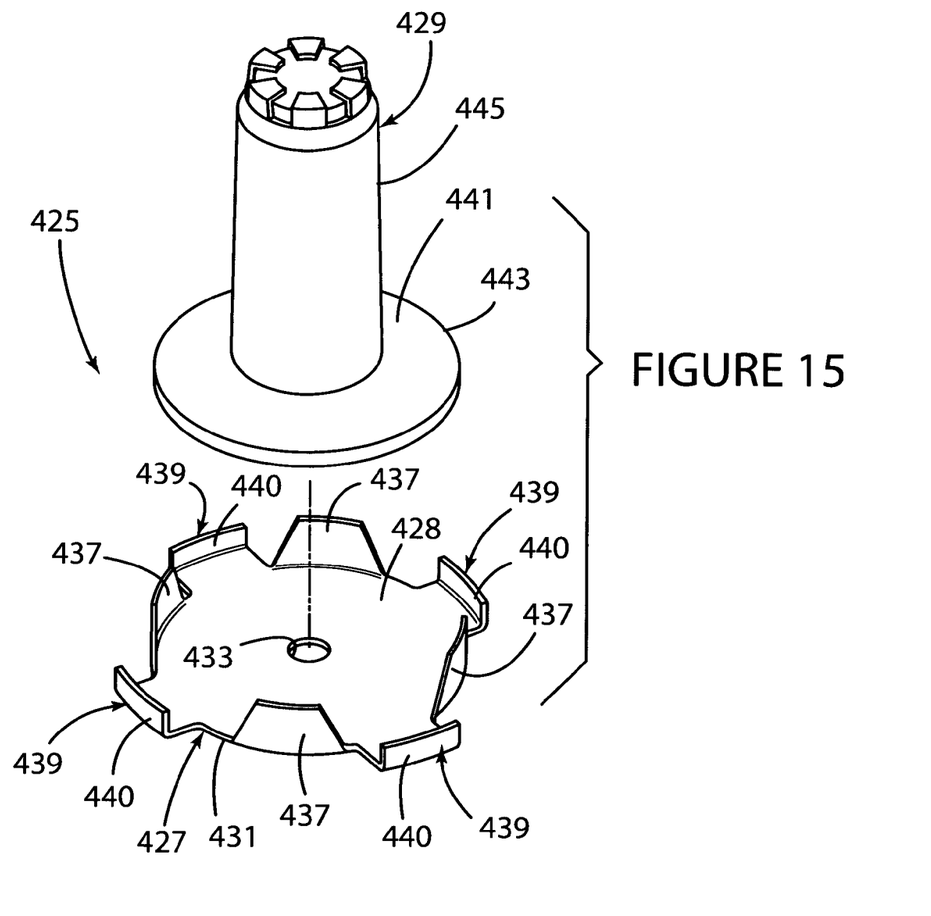
FIG. 15 is an enlarged exploded perspective view of the magnet carrier and anti-rotation plate combination shown in FIGS. 13 and 14.

FIGS. 13-15 depict yet a further embodiment of an anti-rotation assembly 425 in accordance with the present invention which comprises an anti-rotation disc or plate 427 and a magnet carrier 429.

Anti-rotation disc or plate 427 has a circular base 428, an outer peripheral circumferential edge 431, a central aperture 433, a plurality of crimp tabs 437 projecting outwardly and upwardly from the peripheral edge 431, and a plurality of elongate legs 439 also extending outwardly from the peripheral edge 431. The fingers 437 and legs 439 extend around the base 428 in a spaced-apart and alternating equidistant relationship. The tabs 437 are shown in FIG. 15 in their uncrimped position and orientation generally normal to the base 428 of plate 427. The legs 439 extend outwardly from the peripheral edge 431 of plate 427 in a relationship generally co-planar with the base 429. Each of the legs 439 includes a distal upturned ear 440 extending generally normally upwardly from the distal end of each of the legs 439.

Magnet carrier 429 has a generally circular base 441 with an outer peripheral circumferential edge 443, and a vertical, hollow, cylindrical magnet tube or housing 445 extending generally normally upwardly from the center of the base 441.

As shown in FIG. 14, the plate 427 is seated and secured to the base 80 of the cup 82 in the interior of linear position sensor 10 and the shaft 84 couples and secures the plate 427 to the cup 82 in the same manner as described earlier with respect to the plate 27 of anti-rotation assembly 25 and thus the earlier description with reference to the plate 27 and assembly 25 is incorporated herein by reference.

As additionally shown in FIG. 14, the exterior face of each of the ears 440 of the legs 439 of the plate 427 is positioned in abutting relationship with and against the interior face of one of the coils 497 of helical spring 495 which is also located in the interior of the linear position sensor 10 and seated on the base 80 of the cup 82 in linear position sensor 10 to provide for the concentric positioning and compression of the spring 495 in linear position sensor 10 and eliminate the risk of collision and controlling axial force compression in the interior of linear position sensor 10.

As shown in FIG. 14, magnet carrier 429 is located and seated in the interior of linear position sensor 10 in a relationship wherein the lower face or surface of the base 441 of magnet carrier 429 is seated against the upper face or surface of the base 428 of plate 427; the tube 445 is co-linearly aligned with the shaft 84; and the peripheral edge 443 of the base 441 of magnet carrier 429 is abutted against the inside face of respective crimp tabs 437 on plate 427. The tabs 437 are bent inwardly and crimped into abutting relationship with the top surface or face of the base 429 of magnet carrier 429 to secure the magnet carrier 429 to the plate 427, thus preventing the rotation of the magnet carrier 429 and the rotation of the magnet 100 (FIG. 1) relative to the sensor 102 (FIG. 1) outside of allowable variations in rotational movement to eliminate the risk of undesired magnetic field and signal variations as described above.

Although not shown in any of the FIGURES, it is understood that a compression o-ring may be sandwiched between the lower surface of the base 441 of the magnet carrier 429 and the upper surface of the base 428 of the plate 427 to enhance the crimp action and connection between the plate 427 and magnet carrier 429.

Figure 16:
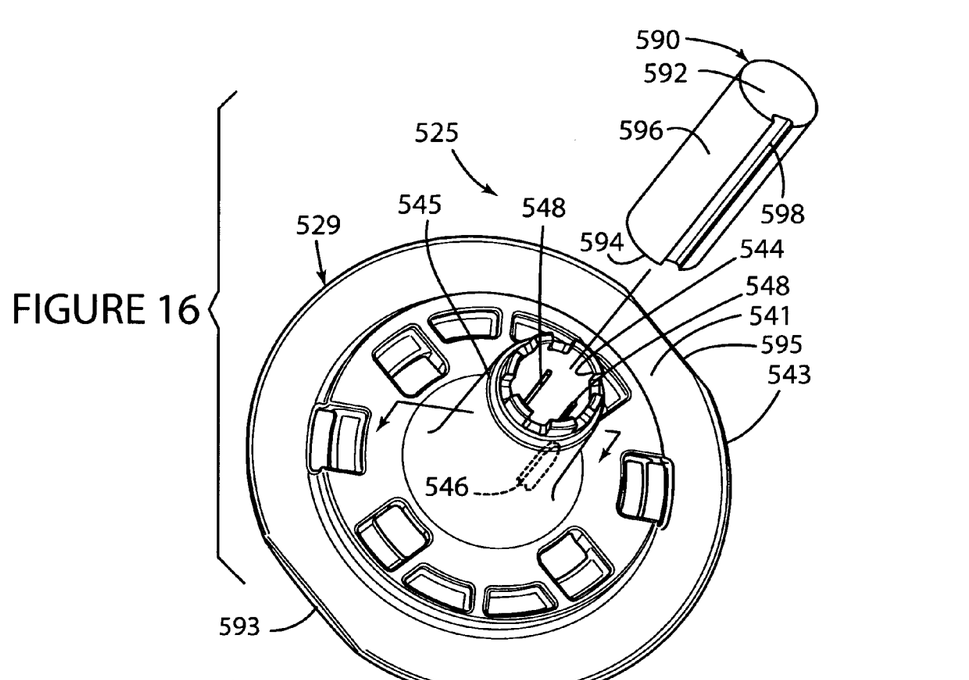
FIG. 16 is an enlarged exploded perspective view of a magnet carrier/anti-rotation magnet combination in accordance with the present invention.
Figure 17:
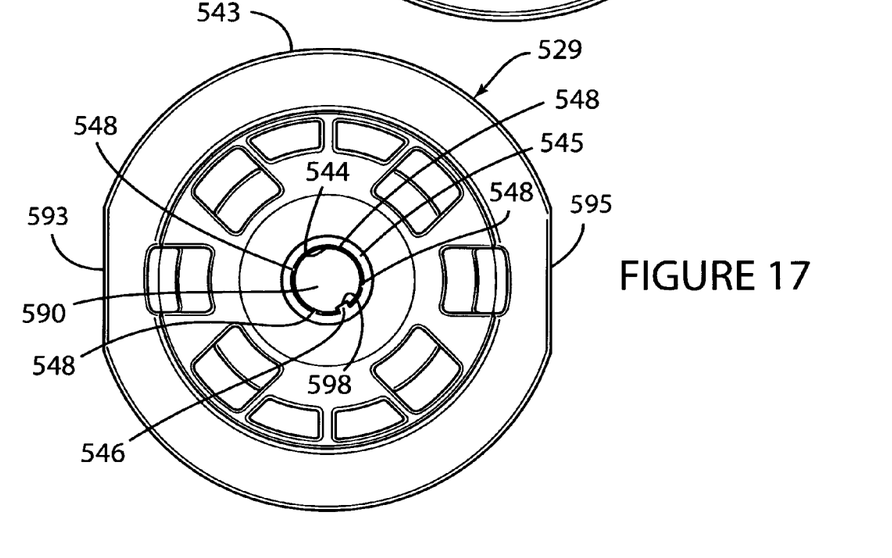
FIG. 17 is an enlarged horizontal cross-sectional view of the magnet carrier/anti-rotation magnet combination of FIG. 16 with the anti-rotation magnet secured in the magnet carrier.

FIGS. 16 and 17 depict an anti-rotation assembly 525 in accordance with the present invention which comprises a magnet carrier 529 and an anti-rotation magnet 590.

Magnet carrier 529 has a generally circular base 541 with an outer peripheral circumferential edge 543 and a vertical, hollow, cylindrical magnet tube or housing 545 extending generally normally upwardly from the center of the base 541. In the embodiment of FIGS. 16 and 17, the peripheral edge 543 of magnet carrier 529 additionally includes a pair of diametrically opposed straight segments 593 and 595 defining a pair of keying features for automated feeding of the magnet carrier 529 during assembly. Tube 545 includes an interior cylindrical surface 544 having a key defined by an elongate projection or bump 546 protruding outwardly therefrom and extending the length of the tube 545 in an orientation generally normal to the base 541. The interior cylindrical surface 544 of the tube 545 additionally includes a plurality of elongate, spaced-apart, parallel crush ribs 548 projecting outwardly therefrom and extending around the circumference of the interior surface 544 in a relationship spaced from and parallel to the elongate key 546.

The magnet 590 is in the form of an elongate solid cylinder which includes respective top and bottom surfaces 592 and 594 and a side exterior longitudinal surface 596 having an elongate groove or recess 598 defined therein and extending generally between the top and bottom surfaces 592 and 594.

As shown in FIG. 17, magnet 590 is slid into and secured in the interior of the tube 545 in a relationship wherein the key 546 in tube 545 is aligned with and extends and protrudes into the groove 598. The diameter of the tube 545 and the diameter of magnet 590 are such that the ribs 548 in the tube 545 are crushed when magnet 590 is slid into the tube 545, thus providing for a friction fit between magnet 590 and tube 545.

The combination of the key 546 in tube 545 and groove 598 in magnet 590 eliminates the risk of any rotation of the magnet 590 relative to the tube 545 outside of allowable variations of rotational movement to eliminate the risk of undesired magnetic field measurements and thus incorrect signal variations as described above.

Figure 18:
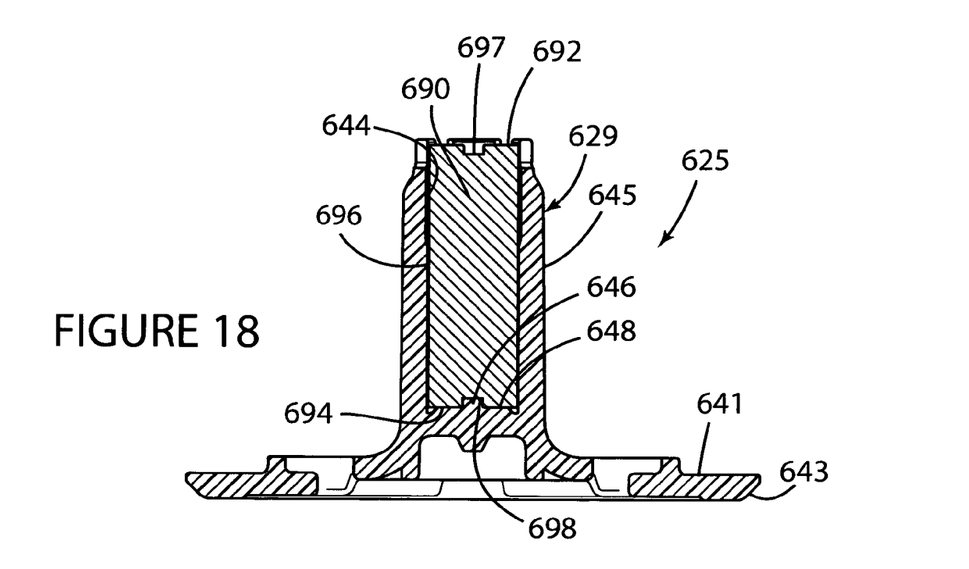
FIG. 18 is an enlarged vertical cross-sectional view of another embodiment of a magnet carrier/anti-rotation magnet combination in accordance with the present invention.
Figure 19:
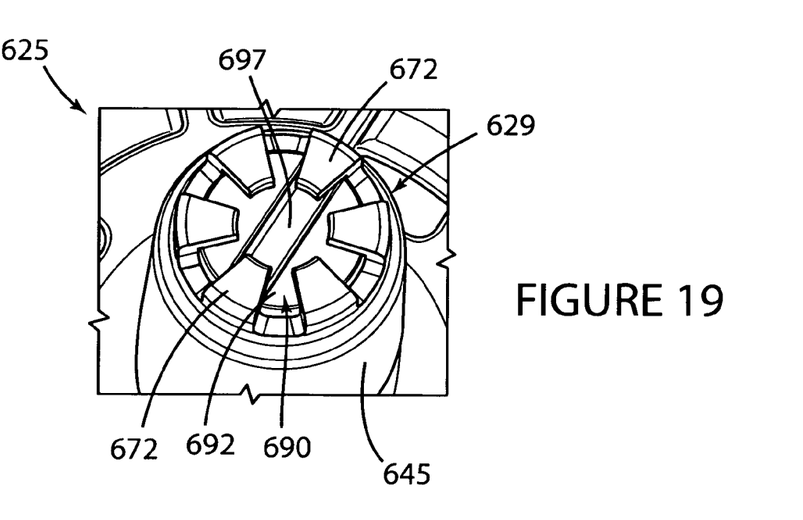
FIG. 19 is an enlarged broken top perspective view of the magnet carrier/anti-rotation magnet combination of FIG. 18.

FIGS. 18 and 19 depict another anti-rotation assembly 625 in accordance with the present invention which comprises a magnet carrier 629 and an anti-rotation magnet 690.

Magnet carrier 629 has a generally circular base 641 with an outer peripheral circumferential edge 643 and a vertical, hollow, cylindrical magnet tube or housing 645 extending generally normally upwardly from the center of the base 641. Tube 645 includes an interior cylindrical surface 644 and an interior lower or bottom horizontal base or surface 648 with a key defined by a projection or bump 646 protruding outwardly therefrom.

Magnet 690 is in the form of an elongate solid cylinder which includes respective top and bottom surfaces 692 and 694 and a side exterior longitudinal surface 696. Each of the top and bottom surfaces 692 and 694 includes an elongate groove 697 and 698 formed therein.

As shown in FIG. 18, magnet 690 is slid into and secured in the interior of tube 645 in a relationship wherein the bottom surface 694 of magnet 690 is abutted against the bottom interior surface or base 648 of the tube 645 and the key 646 extends and protrudes into the groove 698 defined in the bottom surface 694 of magnet 690.

As shown in FIG. 19, the magnet carrier 629 and, more specifically, the tube 645 thereof includes a plurality of prongs 672 extending outwardly and inwardly from a top peripheral edge 674 thereof. Two of the prongs 672 are opposed to each other and are positioned and extend into the groove 697 formed in the top surface 692 of the magnet 690.

Thus, according to the invention, the use of a key 646/ groove 698 combination and prong 672/groove 697 combination eliminates the risk of rotation of the magnet 690 relative to the tube 645 outside of allowable rotational variations to again eliminate the risk of undesired magnetic field and signal variations as described above.

While the invention has been taught with specific reference to the embodiments shown, it is understood that a person of ordinary skill in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A linear position sensor comprising:
    a housing;
    a magnet carrier located and movable linearly in the housing, the magnet carrier including a base with a receptacle;
    a magnet carried by the magnet carrier; and
    a plate coupled to the housing and the magnet carrier, the plate including at least one finger extending into the receptacle in the base of the magnet carrier for preventing the rotation of the magnet carrier relative to the plate.

2. The linear position sensor of claim 1 wherein the base of the magnet carrier includes an outer circumferential peripheral edge and the receptacle is defined by an interior through-hole extending through the base and spaced from the outer circumferential peripheral edge of the magnet carrier, the finger on the plate extending through the interior through-hole.

3. A linear position sensor comprising:
    a housing;
    a magnet carrier located in the housing, the magnet carrier being adapted for linear movement in the housing;
    a magnet located in the magnet carrier;
    anti-rotation means for preventing the rotation of he magnet; and
    a shaft and a cup both adapted for linear movement in the housing and wherein the magnet carrier includes a base having at least one receptacle defined therein and the anti-rotation means comprises an anti-rotation plate seated on the cup in the housing and the shaft couples the anti-rotation plate to the cup and the magnet carrier is seated in the cup and against the anti-rotation plate, the anti-rotation plate including at least one finger extending into the receptacle in the base of the magnet carrier to prevent the rotation of the magnet carrier.

4. The linear position sensor of claim 3 wherein the base of the magnet carrier includes opposed upper and lower surfaces and an outer peripheral edge and the receptacle is defined by an interior through-hole spaced from the outer peripheral edge of the magnet carrier and extending between the upper and lower surfaces of the magnet carrier.

* * * * *